United States Patent
Kim et al.

(10) Patent No.: US 11,876,157 B2
(45) Date of Patent: Jan. 16, 2024

(54) POSITIVE ELECTROLYTE ACTIVE MATERIAL FOR SECONDARY BATTERY, PREPARATION METHOD THEREOF, AND LITHIUM SECONDARY BATTERY INCLUDING SAME

(71) Applicant: LG Chem, Ltd., Seoul (KR)

(72) Inventors: Won Tae Kim, Daejeon (KR); Jong Yeol Yu, Daejeon (KR); Seoung Chul Ha, Daejeon (KR); Sun Sik Shin, Daejeon (KR)

(73) Assignee: LG Chem, Ltd.

( * ) Notice: Subject to any disclaimer, the term of this patent is extended or adjusted under 35 U.S.C. 154(b) by 547 days.

(21) Appl. No.: 17/274,330

(22) PCT Filed: Sep. 30, 2019

(86) PCT No.: PCT/KR2019/012712
§ 371 (c)(1),
(2) Date: Mar. 8, 2021

(87) PCT Pub. No.: WO2020/067830
PCT Pub. Date: Apr. 2, 2020

(65) Prior Publication Data
US 2021/0328213 A1    Oct. 21, 2021

(30) Foreign Application Priority Data
Sep. 28, 2018   (KR) .................. 10-2018-0115731

(51) Int. Cl.
*H01M 4/36*     (2006.01)
*C01G 53/00*    (2006.01)
(Continued)

(52) U.S. Cl.
CPC .......... *H01M 4/366* (2013.01); *C01G 53/44* (2013.01); *H01M 4/0471* (2013.01);
(Continued)

(58) Field of Classification Search
CPC ...... H01M 4/366; H01M 4/505; H01M 4/525; H01M 4/0471; H01M 10/0525; H01M 2004/028
See application file for complete search history.

(56) References Cited

U.S. PATENT DOCUMENTS 9,586,834 B2    3/2017   Yamamoto et al.
2011/0165463 A1* 7/2011   Chang .................. H01M 4/366
                                                429/223
(Continued)

FOREIGN PATENT DOCUMENTS

CN    106505195 A    3/2017
EP    2693535 A1     2/2014
(Continued)

OTHER PUBLICATIONS

Search for European Application No. 19865998.9 dated Sep. 7, 2021. 2 pgs.
(Continued)

*Primary Examiner* — Matthew J Merkling
(74) *Attorney, Agent, or Firm* — Lerner David LLP (57) ABSTRACT

A method for preparing a positive electrode active material for a secondary battery is provided. The method includes preparing a lithium composite transition metal oxide including nickel, cobalt, and manganese (Mn), wherein the content of the nickel in the total content of the transition metal is 60 mol % or greater. The lithium composite transition metal oxide, $MgF_2$ as a fluorine (F) coating source, and a boron (B) coating source undergoes dry mixing and heat treatment to form a coating portion on the particle surface of the lithium composite transition metal oxide. In addition, a positive electrode active material prepared as described above, is also provided.

10 Claims, 2 Drawing Sheets

(51) Int. Cl.
*H01M 4/04* (2006.01)
*H01M 4/505* (2010.01)
*H01M 4/525* (2010.01)
*H01M 10/0525* (2010.01)
*H01M 4/02* (2006.01)

(52) U.S. Cl.
CPC ........... *H01M 4/505* (2013.01); *H01M 4/525* (2013.01); *C01P 2002/52* (2013.01); *C01P 2004/80* (2013.01); *C01P 2006/40* (2013.01); *H01M 10/0525* (2013.01); *H01M 2004/028* (2013.01)

(56) References Cited

U.S. PATENT DOCUMENTS

| | | |
|---|---|---|
| 2014/0045068 A1 | 2/2014 | Yamamoto et al. |
| 2014/0113193 A1 | 4/2014 | Tsunozaki et al. |
| 2014/0205898 A1 | 7/2014 | Lee et al. |
| 2015/0243978 A1* | 8/2015 | Shon ................ H01M 4/485 423/594.15 |
| 2016/0013476 A1 | 1/2016 | Oh et al. |
| 2016/0104886 A1 | 4/2016 | Tsunozaki |
| 2016/0126542 A1* | 5/2016 | Han .................. H01M 10/052 429/223 |
| 2017/0187035 A1 | 6/2017 | Yanagihara et al. |
| 2018/0316015 A1* | 11/2018 | Lee ...................... C01G 51/00 |
| 2018/0351169 A1 | 12/2018 | Oh et al. |
| 2020/0083524 A1* | 3/2020 | Baek ................... H01M 4/587 |
| 2022/0115656 A1* | 4/2022 | Toyama ............ H01M 4/0471 |

FOREIGN PATENT DOCUMENTS

| | | |
|---|---|---|
| EP | 2763218 A2 | 8/2014 |
| EP | 3346527 A1 | 7/2018 |
| JP | 2014127235 A | 7/2014 |
| JP | 2015536558 A | 12/2015 |
| JP | 6253408 B2 | 12/2017 |
| JP | 6382810 B2 | 8/2018 |
| KR | 101049543 B1 | 7/2011 |
| KR | 20150050458 A | 5/2015 |
| KR | 20150076903 A | 7/2015 |
| KR | 20160137449 A | 11/2016 |
| KR | 20170039648 A | 4/2017 |
| KR | 20170103507 A | 9/2017 |
| KR | 20170112177 A | 10/2017 |
| KR | 101785266 B1 | 11/2017 |
| WO | 2012133113 A1 | 10/2012 |

OTHER PUBLICATIONS

Search report from International Application No. PCT/KR2019/012712, dated Jan. 10, 2020.

Sun, Shuwei, et al., "Surface modified Li[Li0.2NiCo0.07Mn0.56]O2 nanoparticles with MgF2 as cathode for Li-ion battery." Solid State Ionics, vol. 278, 2015 (Received Feb. 10, 2015; Revised; May 8, 2015; Accepted May 29, 2015; available online Jun. 14, 2015); pp. 85-90.

* cited by examiner

POSITIVE ELECTROLYTE ACTIVE MATERIAL FOR SECONDARY BATTERY, PREPARATION METHOD THEREOF, AND LITHIUM SECONDARY BATTERY INCLUDING SAME

CROSS-REFERENCE TO RELATED APPLICATIONS

The present application is a national stage entry under 35 U.S.C. § 371 of International Application No. PCT/KR2019/012712 filed on Sep. 30, 2019, which claims priority to Korean Patent Application No. 10-2018-0115731, filed on Sep. 28, 2018, in the Korean Intellectual Property Office, the disclosures of which are incorporated herein in their entirety by reference.

TECHNICAL FIELD

The present invention relates to a positive electrode active material for a secondary battery, a preparation method thereof, and a lithium secondary battery including the same.

BACKGROUND ART

Recently, the demand for a small and lightweight secondary battery having a relatively high capacity is rapidly increased due to the rapid spread of electronic devices using batteries, such as cell phones, notebook computers, electric vehicles, and the like. Particularly, a lithium secondary battery is lightweight and has a high energy density, and thus, is attracting attention as a driving power source for portable devices. Therefore, research and development efforts for improving the performance of a lithium secondary battery have been actively conducted.

A lithium secondary battery generates electric energy by an oxidation and reduction reaction when lithium ions are intercalated/deintercalated from a positive electrode and the a negative electrode when an organic electrolyte or a polymer electrolyte is charged between the positive electrode and the negative electrode made of active materials capable of intercalation and deintercalation of lithium ions.

As a positive electrode active material of a lithium secondary battery, a lithium cobalt oxide ($LiCoO_2$), a lithium nickel oxide ($LiNiO_2$), a lithium manganese oxide ($LiMnO_2$, $LiMn_2O_4$, or the like), a lithium iron phosphate compound ($LiFePO_4$), and the like have been used. In addition, as a method for improving the thermal stability of $LiNiO_2$, which has a low thermal stability, while maintaining the excellent reversible capacity thereof, a lithium composite transition metal oxide (hereinafter, simply referred to as an 'NCM-based lithium oxide') in which a part of nickel (Ni) is substituted with cobalt (Co) and manganese (Mn) has been developed. However, a typical NCM-based lithium composition transition metal oxide which has been developed does not have sufficient capacity properties, so that there has been a limitation in the application thereof.

In order to solve such problems, in recent years, studies have been conducted to increase the content of Ni in an NCM-based lithium composite transition metal oxide. However, in the case of a nickel-rich positive electrode active material having a high content of nickel, the capacity thereof is increased but depending on the charge depth, rapid oxygen deintercalation proceeds according to the oxidation of $Ni^{2+}$ to $Ni^{3+/4+}$. The deintercalated oxygen reacts with an electrolyte to change the intrinsic properties of a material, and has a problem of causing the instability of a lattice structure and furthermore, the collapse of the structure.

Therefore, in order to secure the stability of the Ni-rich high-Ni NCM-based lithium composite transition metal oxide, a lot of research is being conducted on surface modification incorporating a coating technique. However, there is still a need for the development of a high-Ni NCM-based positive electrode active material capable of suppressing the deterioration in battery performance such as capacity reduction and output while improving thermal stability. Particularly, there is still a need for development of a high-Ni NCM-based positive electrode active material having stability under a high voltage of 4.3 V or higher.

DISCLOSURE OF THE INVENTION

Technical Problem

An aspect of the present invention provides a high-Ni NCM-based positive electrode active material containing 60 mol % or more of nickel (Ni) in order to secure a high capacity, the positive electrode active material for a secondary battery capable of suppressing resistance increase and output reduction depending on a coating material while significantly improving stability. Particularly, the present invention is to provide a positive electrode active material for a secondary battery implementing excellent thermal stability and excellent electrochemical properties even at a high voltage of 4.3 V or higher.

Technical Solution

According to an aspect of the present invention, there is provided a method for preparing a positive electrode active material for a secondary battery, the method including preparing a lithium composite transition metal oxide including nickel (Ni), cobalt (Co), and manganese (Mn), wherein the content of the nickel (Ni) in the total content of the transition metal is 60 mol % or greater, and subjecting the lithium composite transition metal oxide, $MgF_2$ as a fluorine (F) coating source, and a boron (B) coating source to dry mixing and heat treatment to form a coating portion on the particle surface of the lithium composite transition metal oxide.

According to another aspect of the present invention, there is provided a positive electrode active material for a secondary battery, the material including a lithium composite transition metal oxide including nickel (Ni), cobalt (Co), and manganese (Mn), and a coating portion formed on the particle surface of the lithium composite transition metal oxide, wherein the lithium composite transition metal oxide has the nickel (Ni) in the content of 60 mol % or greater in the total content of the transition metal, and the coating portion includes fluorine (F) and boron (B).

According to yet another aspect of the present invention, there is provided a positive electrode including the positive electrode active material and a lithium secondary battery including the positive electrode.

Advantageous Effects

A positive electrode active material for a secondary battery prepared according to the present invention is a high-Ni NCM-based positive electrode active material containing 60 mol % or more of nickel (Ni), which may secure a high capacity and solve the problem of the deterioration in structural/chemical stability caused by the increase in nickel (Ni) of the high-Ni NCM-system. As a result, excellent thermal stability may be secured and resistance increase and output reduction depending on a coating material may be suppressed as well. Particularly, excellent thermal stability and excellent electrochemical properties even at a high voltage of 4.3 V or higher may be implemented.

MODE FOR CARRYING OUT THE INVENTION

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

<Method for Preparing Positive Electrode Active Material>

A positive electrode active material for a secondary battery is prepared by preparing a lithium composite transition metal oxide including nickel (Ni), cobalt (Co), and manganese (Mn), wherein the content of the nickel (Ni) in the total content of the transition metal is 60 mol % or greater, and subjecting the lithium composite transition metal oxide, $MgF_2$ as a fluorine (F) coating source, and a boron (B) coating source to dry mixing and heat treatment to form a coating portion on the particle surface of the lithium composite transition metal oxide.

A method for preparing a positive electrode active material of the present invention will be described in detail step by step below.

First, a lithium composite transition metal oxide including nickel (Ni), cobalt (Co), and manganese (Mn), wherein the content of the nickel (Ni) in the total content of the transition metal is 60 mol % or greater is prepared.

The lithium composite transition metal oxide is a high-nickel (Ni) NCM-system having the nickel (Ni) in the content of 60 mol % or greater in the total content of the transition metal. More preferably, the content of the nickel (Ni) may be 65 mol % or greater, yet more preferably 80 mol % or greater in the total content of the transition metal. When the content of the nickel (Ni) satisfies 60 mol % or greater in the total content of the transition metal of the lithium composite transition metal oxide, a high capacity may be secured.

More specifically, the lithium composite transition metal oxide may be represented by Formula 1 below.

$$Li_pNi_{1-(x1+y1+z1)}Co_{x1}Mn_{y1}M^a_{z1}O_{2+\delta}$$ [Formula 1]

In the Formula above, $M^a$ is at least one selected from the group consisting of Zr, W, Mg, Al, Ce, Hf, Ta, La, Ti, Sr, Ba, Nb, Mo, and Cr, and $0.9 \le p \le 1.5$, $0 < x1 \le 0.2$, $0 < y1 \le 0.2$, $0 \le z1 \le 0.1$, $-0.1 \le \delta \le 1$, and $0 < x1+y1+z1 \le 0.4$.

In the lithium composite transition metal oxide of Formula 1 above, Li may be included in an amount corresponding to p, that is, $0.9 \le p \le 1.5$. If p is less than 0.9, capacity may be deteriorated. If greater than 1.5, particles may be sintered in a firing process, so that it may be difficult to prepare a positive electrode active material. When considering the remarkable effect of improving the capacity properties of the positive electrode active material according to the control of Li content and the balance of sintering in the preparation of the active material, the Li may be included, more preferably, in an amount of $1.0 \le p \le 1.15$.

In the lithium composite transition metal oxide of Formula 1 above, Ni may be included in an amount corresponding to $1-(x1+y1+z1)$, for example, $0.60 \le 1-(x1+y1+z1) < 1$. When the content of Ni in the lithium composite transition metal oxide of Formula 1 above is 0.06 or greater, the amount of Ni sufficient to contribute to charge and discharge may be secured, so that a high capacity may be achieved. More preferably, Ni may be included in an amount of $0.65 \le 1-(x1+y1+z1) \le 0.99$.

In the lithium composite transition metal oxide of Formula 1 above, Co may be included in an amount corresponding to x1, that is, $0 < x1 \le 0.2$. When the content of Co in the lithium composite transition metal oxide of Formula 1 above is greater than 0.2, costs may be increased. When considering the remarkable effect of improving the capacity properties according to the inclusion of Co, the Co may be included, more specifically, in an amount of $0.05 \le x1 \le 0.2$.

In the lithium composite transition metal oxide of Formula 1 above, when considering the effect of improving lifespan properties, the Mn may be included in an amount corresponding to y1, that is, $0 < y1 \le 0.2$. When the y1 in the lithium composite transition metal oxide of Formula 1 above is greater than 0.2, the output properties and capacity properties of a battery may be rather deteriorated. Therefore, the Mn may be included, more specifically, in an amount of $0.05 \le y1 \le 0.2$.

In the lithium composite transition metal oxide of Formula 1 above, $M^a$ may be a doping element included in a crystal structure of the lithium complex transition metal oxide, and $M^a$ may be included in an amount corresponding to z1, that is, $0 \le z1 \le 0.1$.

Next, the lithium composite transition metal oxide, $MgF_2$ as a fluorine (F) coating source, and a boron (B) coating source are subjected to dry mixing and heat treatment to form a coating portion on the particle surface of the lithium composite transition metal oxide.

In the present invention, $MgF_2$ is used as a fluorine (F) coating source to coat fluorine (F), and a boron (B) coating source is mixed therewith to coat Boron (B). When the $MgF_2$ is used to coat fluorine (F), F of $MgF_2$ substitutes some oxygen on the surface of the positive electrode active material and a lithium boron oxide (LiBO) during heat treatment to form electron holes, thereby improving electron mobility. Due to the F substitution of some oxygen, the distance between the transition metal and oxygen gets closer, thereby minimizing oxygen deintercalation which may occur when the oxidation number of the transition metal changes during an electrochemical reaction. Through the above, the generation of gas may be suppressed and the formation of an SEI film may be facilitated. and the corrosion of the surface of the positive electrode active material due to HF generated by the decomposition of the electrolyte may be prevented. By using $MgF_2$ as a fluorine (F) coating source as in the present invention, there is a remarkable effect of suppressing the structure degradation of the positive electrode active material. However, $MgF_2$ has a high melting point of about 1,263° C., so that it was difficult to use the same as a coating source in the prior art. Even if wet coating was considered, it was also difficult to apply wet coating to $MgF_2$ due to the low solubility thereof. In addition, Mg has a disadvantage of reducing charge/discharge capacity even in a small amount.

Therefore, the present invention uses the $MgF_2$ and a boron (B) coating source together when performing dry coating to lower the melting point of the $MgF_2$, thereby increasing the ease of coating and significantly improving electrochemical properties. In addition, a lithium boron oxide (LiBO) produced by the boron (B) coating has an effect of improving the charge/discharge capacity. The positive electrode active material prepared as described above may suppress resistance increase and output reduction depending on a coating material while significantly improving stability, and in particular, may implement excellent thermal stability and excellent electrochemical properties even at a high voltage of 4.3 V or higher.

The boron (B) coating source may include at least one selected from the group consisting of $B_4C$, $B_2O_3$, and $H_3BO_3$, and may preferably be $H_3BO_3$. The $H_3BO_3$ has a melting point of about 170° C., which is relatively lower than that of other boron (B) coating sources such as $B_4C$ (about 2,763° C.) and $B_2O_3$ (about 450° C.). In the case of coating with $H_3BO_3$, when heat treatment is performed, hydrogen is easily deintercalated and boron oxide (BO) anions are simply formed, so that the coating is easy, and the effect of improving electrochemical performance may be more excellent.

The boron (B) coating source, $H_3BO_3$ in particular, is easily anionized in a relatively low temperature range, which may cause a reaction with residual lithium and lower the melting point of $MgF_2$ through the driving force generated when forming a lithium boron oxide (LiBO). That is, by using a boron (B) coating source, in particular, by using the mixture of $H_3BO_3$ and $MgF_2$, it is possible to significantly improve the ease of coating and enable uniform coating, and may be effective in improving structural stability and improving charge/discharge capacity.

The $MgF_2$ may be mixed in an amount of 0.002-0.08 parts by weight based on 100 parts by weight of the lithium composite transition metal oxide, more preferably 0.008-0.06 parts by weight, and yet more preferably 0.01-0.04 parts by weight. By mixing and using the $MgF_2$ in the above weight part range, the generation of gas may be suppressed and the formation of an SEI film may be facilitated, and the corrosion of the surface of the positive electrode active material due to HF generated by the decomposition of the electrolyte may be prevented while the deterioration in charge/discharge capacity due to Mg may be minimized.

The boron (B) coating source may be mixed in an amount of 0.09-0.75 parts by weight based on 100 parts by weight of the lithium composite transition metal oxide, more preferably 0.1-0.6 parts by weight, and yet more preferably 0.2-0.4 parts by weight. By mixing the boron (B) coating source, $H_3BO_3$ in particular, in the above weight part range, the melting point of $MgF_2$ may be effectively lowered and the charge/discharge capacity may be improved.

The $MgF_2$ and the boron (B) coating source are subjected to dry mixing with the lithium composite transition metal oxide, and then the mixture is heat treated to form a coating portion. The heat treatment may be performed at 200-600° C., more preferably 300-500° C. The heat treatment may be performed in an atmospheric atmosphere, and may be performed for 2-8 hours, more preferably 3-6 hours.

<Positive Electrode Active Material>

The positive electrode active material prepared as described above includes a lithium composite transition metal oxide including nickel (Ni), cobalt (Co), and manganese (Mn), and a coating portion formed on the particle surface of the lithium composite transition metal oxide, wherein the lithium composite transition metal oxide has the nickel (Ni) in the content of 60 mol % or greater in the total content of the transition metal, and the coating portion includes fluorine (F) and boron (B).

The lithium composite transition metal oxide is applied to the same composition and chemical formula as the lithium composite transition metal oxide in the method for preparing a positive electrode active material described above.

The positive electrode active material prepared according to the preparation method of the present invention includes a coating portion formed on the surface of the lithium composite transition metal oxide particles, wherein the coating portion includes fluorine (F) and boron (B). By forming a coating portion including fluorine (F) and boron (B) as described above in a high-nickel (Ni) NCM-system having 60 mol % or more of nickel (Ni), the present invention may solve the problem of the deterioration of structural/chemical stability caused by the increase in nickel (Ni) of the high-Ni NCM-system, and may secure excellent thermal stability. In addition, the generation of gas may be suppressed and the formation of an SEI film may be facilitated, and the corrosion of the surface of the positive electrode active material due to HF generated by the decomposition of the electrolyte may be prevented while resistance increase and output reduction depending on a coating material may be suppressed and the deterioration in charge/discharge capacity may be suppressed. Particularly, the positive electrode active material prepared as described above may implement excellent thermal stability and excellent electrochemical properties even at a high voltage of 4.3 V or higher.

Fluorine (F) included in the coating portion may be contained in 100-300 ppm based on the total weight of the positive electrode active material, more preferably 100-250 ppm, and yet more preferably 120-200 ppm.

Boron (B) included in the coating portion may be contained in 300-700 ppm based on the total weight of the positive electrode active material, more preferably 300-650 ppm, and yet more preferably 350-600 ppm.

By coating the fluorine (F) and boron (B) in a content satisfying the above range, it is possible to ensure excellent thermal stability even in the case of a high-nickel (Ni) NCM-system having 60 mol % or more of nickel (Ni) and, there is an effect of reducing room temperature resistance and reducing gas generation.

<Positive Electrode and Secondary Battery>

According to another embodiment of the present invention, a positive electrode for a lithium secondary battery including the positive electrode active material and a lithium secondary battery including the positive electrode are provided.

Specifically, the positive electrode includes a positive electrode current collector and a positive electrode active material layer formed on the positive electrode current collector and including the positive electrode active material.

In the positive electrode, the positive electrode current collector is not particularly limited as long as it has conductivity without causing a chemical change in the battery.

For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3-500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

In addition, the positive electrode active material layer may include a conductive material and a binder, together with the positive electrode active material described above.

At this time, the conductive material is used to impart conductivity to an electrode, and any conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1-30 wt % based on the total weight of the positive electrode active material layer.

In addition, the binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1-30 wt % based on the total weight of the positive electrode active material layer.

The positive electrode may be manufactured according to a typical method for manufacturing a positive electrode except that the positive electrode active material described above is used. Specifically, the positive electrode may be manufactured by applying a composition for forming a positive electrode active material layer including the positive electrode active material described above and optionally, a binder and a conductive material on the positive electrode current collector, followed by drying and roll-pressing. At this time, the type and content of the positive electrode active material, the binder, and the conductive material are as described above.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

Alternatively, in another method, the positive electrode may be manufactured by casting a composition for forming a positive electrode active material layer on a separate support and then laminating a film obtained by peeling off from the support on a positive electrode current collector.

According to yet another embodiment of the present invention, there is provided an electrochemical device including the positive electrode. The electrochemical device may be specifically a battery, a capacitor, or the like, and more specifically, may be a lithium secondary battery.

The lithium secondary battery includes a positive electrode, a negative electrode disposed to face the positive electrode, a separator interposed between the positive electrode and the negative electrode, and an electrolyte, and the positive electrode is the same as described above. In addition, the lithium secondary battery may further include a battery case for accommodating an electrode assembly composed of the positive electrode, the negative electrode, and the separator, and a sealing member for sealing the battery case, optionally.

In the lithium secondary battery, the negative electrode includes a negative electrode current collector and a negative electrode active material layer disposed on the negative electrode current collector.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3-500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, a non-woven body, and the like.

The negative electrode active material layer selectively includes a binder and a conductive material in addition to the negative electrode active material. As an example, the negative electrode active material layer may be prepared by applying a composition for forming a negative electrode including a negative electrode active material and selectively a binder and a conductive material on a negative electrode current collector, following by drying.

Alternatively, the negative electrode active material layer may be prepared by casting the composition on a separate support, and then laminating a film obtained by being peeling off from the support on a negative electrode current collector.

As the negative electrode active material, a compound capable of reversible intercalation and deintercalation of lithium may be used. Specific examples thereof may include a carbonaceous material such as artificial graphite, natural graphite, graphitized carbon fiber, and amorphous carbon; a (semi)metallic material alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO\alpha(0<\alpha<2)$, $SnO_2$, vanadium oxide, lithium titanium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbonaceous material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, a meso-carbon microbead, a mesophase pitch, and high-temperature sintered carbon such as petroleum or a coal tar pitch derived coke.

Also, the binder and the conductive material may be the same as those described above in the description of the positive electrode.

Meanwhile, in the lithium secondary battery, the separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used. Furthermore, a coated separator including a ceramic component or a polymer material may be used to secure heat resistance or mechanical strength, and may be used in a single-layered or a multi-layered structure, selectively.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond, an aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. The lithium salt may be used in a concentration range of 0.1-2.0 M. When the concentration of the lithium salt is in the above range, the electrolyte has suitable conductivity and viscosity, thereby exhibiting excellent performance, and lithium ions may effectively move.

In the electrolyte, in order to improve lifetime properties of a battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexammethylphosphoric acid triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in addition to the electrolyte components. At this time, the additive may be included in an amount of 0.1-5 wt %. based on the total weight of the electrolyte.

The lithium secondary battery including the positive electrode active material according to the present invention as describe above stably exhibits excellent discharging capacity, output properties, and capacity retention rate, and thus, may be useful for portable devices such as a mobile phone, a notebook computer, and a digital camera, and in the fired of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

Hereinafter, Examples of the present invention will be described in detail so that those skilled in the art may easily carry out the present invention. However, the present invention may be embodied in many different forms, and is not limited to Examples set forth herein.

Example 1

To a precursor having Ni:Co:Mn in a molar ratio of 65:15:20, lithium carbonate ($Li_2CO_3$) was added such that the molar ratio of Li/Metal (Ni, Co, Mn) becomes 1.06, and the mixed powder was introduced into an alumina crucible for heat treatment. Thereafter, the mixed powder was subjected to heat treatment in an oxygen atmosphere and at 750° C. for 5 hours, and then subjected to heat treatment at 870° C. for 10 hours to prepare a lithium composite transition metal oxide.

Thereafter, lithium composite transition metal oxide powder subjected to heat treatment was pulverized using a mortar, and then added with 0.025 parts by weight of $MgF_2$ and 0.3 parts by weight of $H_3BO_3$ based on 100 parts by weight of the lithium composite transition metal oxide. The mixture was subjected to heat treatment in an atmospheric atmosphere and at 380° C. for 5 hours to prepare a positive electrode active material having a coating portion (F 150 ppm, B 500 ppm).

Example 2

A positive electrode active material having a coating portion (F 150 ppm, B 300 ppm) was prepared in the same manner as in Example 1 except that 0.025 parts by weight of $MgF_2$ and 0.18 parts by weight of $H_3BO_3$ were mixed.

Example 3

A positive electrode active material having a coating portion (F 150 ppm, B 700 ppm) was prepared in the same manner as in Example 1 except that 0.025 parts by weight of $MgF_2$ and 0.42 parts by weight of $H_3BO_3$ were mixed.

Example 4

A positive electrode active material having a coating portion (F 150 ppm, B 700 ppm) was prepared in the same manner as in Example 1 except that 0.025 parts by weight of $MgF_2$ and 0.09 parts by weight of $H_3BO_3$ were mixed and the heat treatment was performed in an atmospheric atmosphere and at 600° C. for 5 hours.

Example 5

A positive electrode active material was prepared in the same manner as in Example 1 except that the heat treatment was performed at 420° C. for 5 hours.

Comparative Example 1

A positive electrode active material was prepared in the same manner as in Example 1 except that the heat treatment was performed without adding a coating source to the lithium composite transition metal oxide.

Comparative Example 2

A positive electrode active material was prepared in the same manner as in Example 1 except that 0.25 parts by weight of $AlF_3$ was used instead of $MgF_2$.

Comparative Example 3

A positive electrode active material was prepared in the same manner as in Example 1 except that 0.63 parts by weight of WO3 and 0.42 parts by weight of $H_3BO_3$ were used instead of $MgF_2$.

Comparative Example 4

A positive electrode active material was prepared in the same manner as in Comparative Example 3 except that 0.32 parts by weight of WO3 and 0.42 parts by weight of $H_3BO_3$ were used.

Comparative Example 5

A positive electrode active material was prepared in the same manner as in Example 1 except that the 0.025 parts by weight of $MgF_2$ was mixed as a coating source to the lithium composite transition metal oxide.

Preparation Example: Manufacturing of Lithium Secondary Battery

The positive electrode active material prepared in each of Examples 1-5 and Comparative Examples 1-5, a carbon black conductive material, and a PVdF binder were mixed in an N-methylpyrrolidone solvent at a weight ratio of 96.5:1.5:2 to prepare a positive electrode mixture material (viscosity: 5000 mPa-s), and the mixture material was applied on one surface of an aluminum current collector, dried at 130° C., and roll-pressed to manufacture a positive electrode A natural graphite negative electrode active material, a carbon black conductive material, and a PVDF binder were mixed in an N-methylpyrrolidone solvent at a weight ratio of 85:10:5 to prepare a composition for forming a negative electrode. Then, the composition was applied on one surface of a copper current collector to manufacture a negative electrode.

A porous polyethylene separator was interposed between the positive electrode and the negative electrode which were prepared as described above to prepare an electrode assembly, and then the electrode assembly was placed inside a case. Thereafter, an electrolyte was injected into the case to manufacture a lithium secondary battery. At this time, the electrolyte was prepared by dissolving lithium hexafluorophosphate ($LiPF_6$) of 1.0 M concentration in an organic solvent composed of ethylene carbonate/dimethyl carbonate/ethylmethyl carbonate (mixing volume ratio of EC/DMC/EMC=3/4/3).

Experimental Example 1: Evaluation of Room Temperature Resistance

The lithium secondary battery manufactured as in Preparation Example using the positive electrode active material of each of Examples 1 to 5 and Comparative Examples 1 to 5 was subjected to the measurement of discharge 10 second resistance at room temperature (25° C.) in the state of SOC 50%, and the results are shown in Table 1.

TABLE 1

| | SOC50 @25° C. | | |
|---|---|---|---|
| | 10 second resistance (Ω) | Capacity correction resistance (mAh · Ω) | Resistance percentage (%) |
| Example 1 | 1.35 | 53.83 | 100.0 |
| Example 2 | 1.38 | 55.19 | 102.5 |
| Example 3 | 1.38 | 55.53 | 103.2 |
| Example 4 | 1.39 | 55.90 | 103.8 |
| Example 5 | 1.40 | 55.96 | 104.0 |
| Comparative Example 1 | 1.46 | 59.40 | 110.3 |
| Comparative Example 2 | 1.44 | 58.20 | 108.1 |
| Comparative Example 3 | 1.50 | 60.20 | 111.8 |
| Comparative Example 4 | 1.58 | 68.40 | 127.1 |
| Comparative Example 5 | 1.44 | 58.52 | 108.7 |

Referring to Table 1, Examples 1 to 5 in which a coating portion was formed according to the present invention had an improved room temperature output when compared with Comparative Examples 1 to 5.

Experimental Example 2 Evaluation of Low-Temperature Output Properties

The lithium secondary battery manufactured as in Preparation Example using the positive electrode active material of each of Examples 1 to 5 and Comparative Examples 1 to 5 was discharged at −25° C. and SOC 20% until 3 V with 0.6 C to evaluate the low-temperature output using a voltage difference generated, and the results are shown in Table 2 and FIG. 1 below.

TABLE 2

|  | Pre-discharge period | | |
| --- | --- | --- | --- |
|  | ΔVoltage | Resistance (Ω) | Resistance percentage (%) |
| Example 1 | −0.437 | 27.429 | 100.0 |
| Example 2 | −0.476 | 30.158 | 109.9 |
| Example 3 | −0.466 | 28.785 | 104.9 |
| Example 4 | −0.499 | 31.790 | 115.9 |
| Example 5 | −0.517 | 32.577 | 118.8 |
| Comparative Example 1 | −0.555 | 35.305 | 128.7 |
| Comparative Example 2 | −0.544 | 33.585 | 122.4 |
| Comparative Example 3 | −0.566 | 35.145 | 128.1 |
| Comparative Example 4 | −0.599 | 37.605 | 137.1 |
| Comparative Example 5 | −0.552 | 33.652 | 122.7 |

Figure 1:
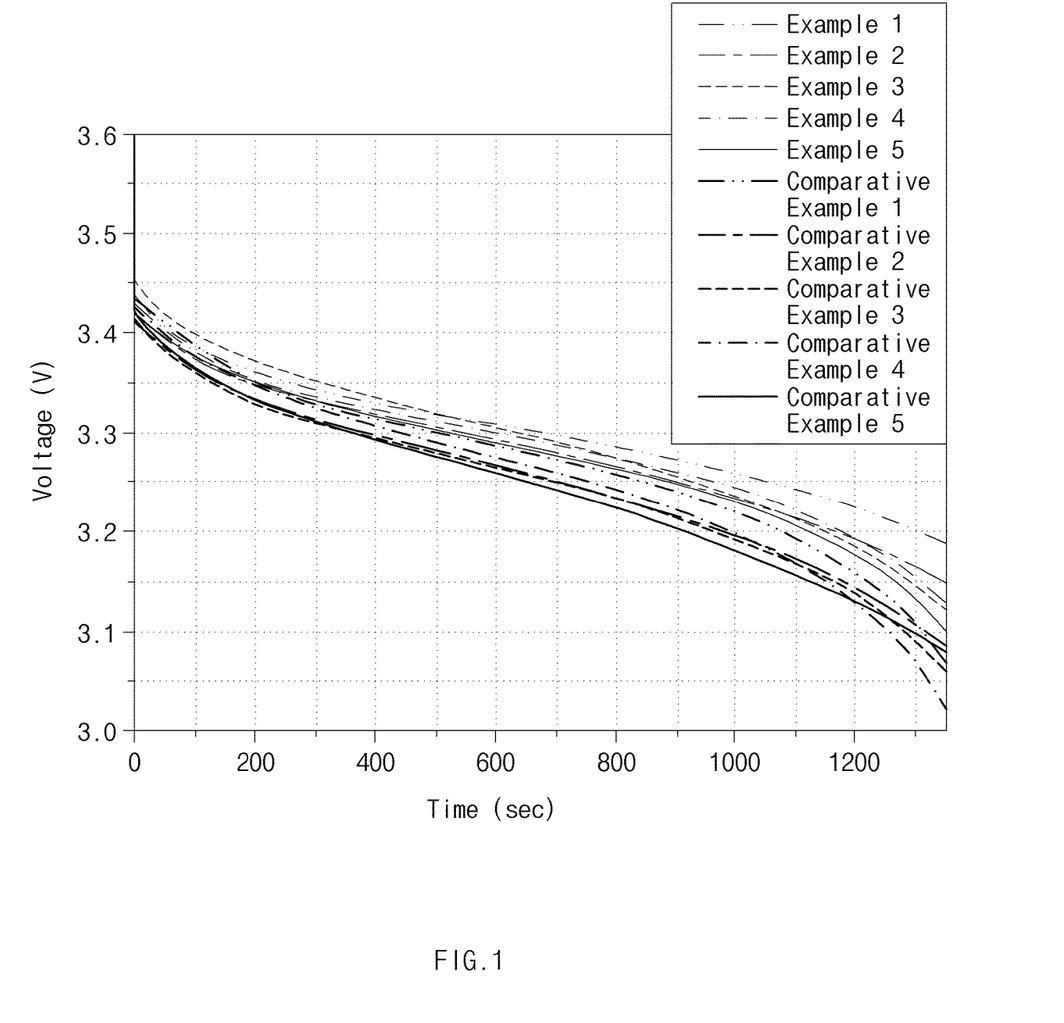
FIG. 1 is a graph showing the result of evaluating the low-temperature output properties of a lithium secondary battery manufactured using a positive electrode active material prepared according to Examples and Comparative Examples.

Referring to Table 2 and FIG. 1, Examples 1 to 5 in which a coating portion was formed according to the present invention had an improved low-temperature output when compared with Comparative Examples 1 to 5.

Experimental Example 3: Gas Generation Evaluation

The lithium secondary battery manufactured as in Preparation Example using the positive electrode active material of each of Examples 1 to 5 and Comparative Examples 1 to 5 was stored for 4 weeks at SOC 100% and 90° C. to evaluate the generation of gas each week, and the results are shown in Table 2.

Figure 2:
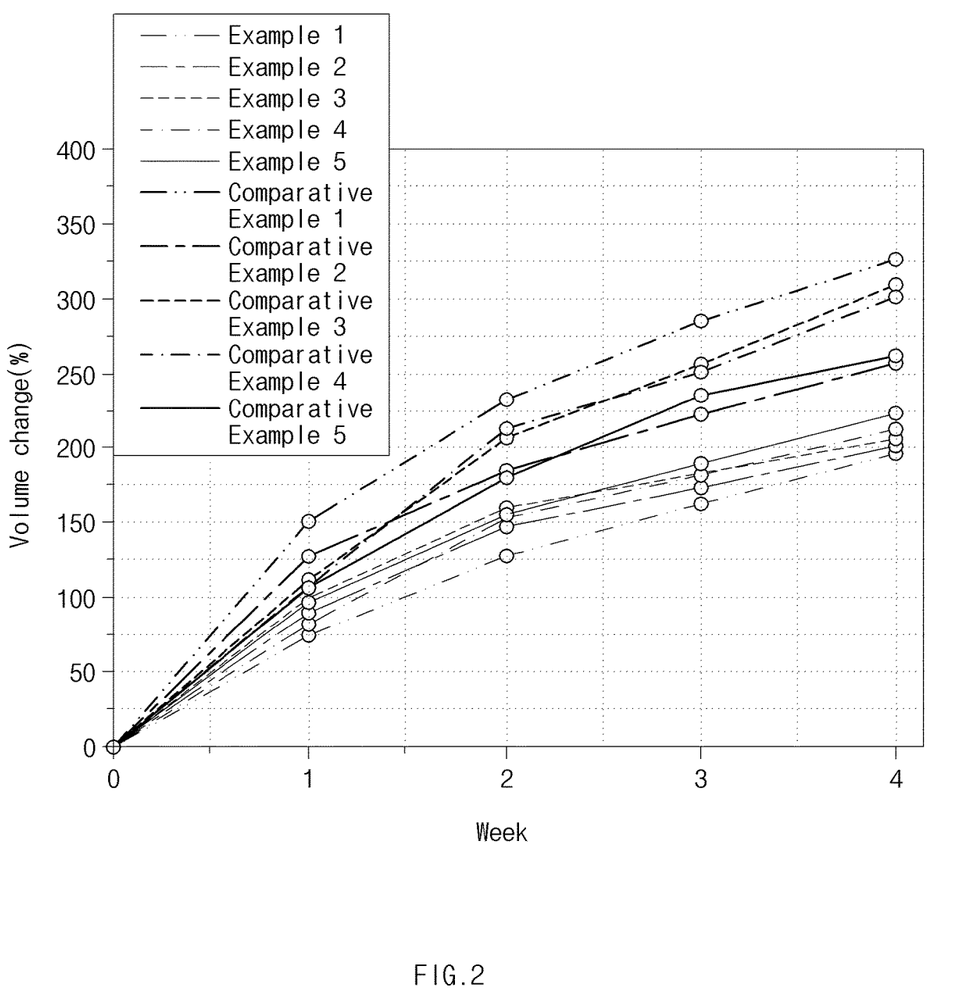
FIG. 2 is a graph showing the result of evaluating the amount of gas generated during the high-temperature storage of a lithium secondary battery manufactured using a positive electrode active material prepared according to Examples and Comparative Examples

Referring to FIG. 2, it can be seen that Examples 1 to 5 in which a coating portion was formed according to the present invention had reduced amount of gas generation after the second week when compared with Comparative Examples 1 to 5.

Experimental Example 4: Lifespan Properties Evaluation

The lithium secondary battery manufactured as in Preparation Example using the positive electrode active material of each of Examples 1 to 5 and Comparative Examples 1 to 5 was charged at 45° C. (terminal current 1/20 C) until the battery reached 1.0 C and 4.25 V in the CCCV mode, and then discharged until the battery reached 3.0 V with a constant current of 1.0 C to perform 400 times of charge/discharge experiments, and the capacity retention rate was measured to conduct the lifespan properties evaluation. The results are shown in Table 3.

TABLE 3

|  | Initial discharge capacity (mA) | Capacity retention rate (%) (@400 times of cycle) |
| --- | --- | --- |
| Example 1 | 41.7 | 90.4 |
| Example 2 | 40.9 | 89.6 |
| Example 3 | 40.7 | 88.7 |
| Example 4 | 40.5 | 87.9 |
| Example 5 | 40.2 | 86.2 |
| Comparative Example 1 | 38.8 | 82.3 |
| Comparative Example 2 | 39.4 | 85.4 |
| Comparative Example 3 | 37.2 | 80.8 |
| Comparative Example 4 | 36.8 | 75.1 |
| Comparative Example 5 | 38.2 | 84.8 |

Referring to Table 3, the positive electrode active material prepared in each of Examples 1 to 5 had an initial capacity slightly higher than that of Comparative Examples 1 to 5, but had significantly improved lifespan properties after 400 times of charge/discharge.

The invention claimed is:

1. A method for preparing a positive electrode active material for a secondary battery, comprising:
   preparing a lithium composite transition metal oxide including nickel (Ni), cobalt (Co), and manganese (Mn) wherein a content of the nickel (Ni) in a total content of the transition metal is 60 mol % or greater; and
   dry mixing and heat treating the lithium composite transition metal oxide, $MgF_2$ as a fluorine (F) coating source, and a boron (B) coating source to form a coating portion on the particle surface of the lithium composite transition metal oxide.

2. The method of claim 1, wherein the boron (B) coating source is $H_3BO_3$.

3. The method of claim 1, wherein the $MgF_2$ is mixed in 0.002-0.08 parts by weight based on 100 parts by weight of the lithium composite transition metal oxide.

4. The method of claim 1, wherein the boron (B) coating source is mixed in 0.09-0.75 parts by weight based on 100 parts by weight of the lithium composite transition metal oxide.

5. The method of claim 1, wherein the heat treating is performed at 200-600° C.

6. A positive electrode active material for a secondary battery comprising:
   a lithium composite transition metal oxide including nickel (Ni), cobalt (Co), and manganese (Mn), and
   a coating portion formed on a particle surface of the lithium composite transition metal oxide,
   wherein the lithium composite transition metal oxide has a nickel (Ni) content of 60 mol % or greater in a total content of the transition metal, and
   the coating portion includes fluorine (F) and boron (B).

7. The positive electrode active material for a secondary battery of claim 6, wherein the fluorine (F) is included in 100-300 ppm based on a total weight of the positive electrode active material.

8. The positive electrode active material for a secondary battery of claim 6, wherein the boron (B) is included in 300-700 ppm based on a total weight of the positive electrode active material.

9. A positive electrode including the positive electrode active material according to claim 6.

10. A secondary battery including the positive electrode according to claim 9.

* * * * *